(12) United States Patent
Pablo Curto et al.

(10) Patent No.: US 9,178,304 B2
(45) Date of Patent: Nov. 3, 2015

(54) THERMOCOUPLE CONNECTOR ADAPTED TO AN ELECTROMAGNETIC GAS VALVE, AND THERMOCOUPLE COMPRISING THE CONNECTOR

(71) Applicant: ORKLI, S.COOP., Ordizia (ES)

(72) Inventors: Marcos Pablo Curto, Hernani (ES); Mikel Zuriarrain Berasategi, Lazkao (ES)

(73) Assignee: ORKLI, S. COOP, Ordizia (ES)

( * ) Notice: Subject to any disclaimer, the term of this patent is extended or adjusted under 35 U.S.C. 154(b) by 0 days.

(21) Appl. No.: 14/376,389

(22) PCT Filed: Jan. 11, 2013

(86) PCT No.: PCT/EP2013/050517
§ 371 (c)(1),
(2) Date: Aug. 1, 2014

(87) PCT Pub. No.: WO2013/117382
PCT Pub. Date: Aug. 15, 2013

(65) Prior Publication Data
US 2014/0374632 A1 Dec. 25, 2014

(30) Foreign Application Priority Data
Feb. 9, 2012 (ES) .................................. 201230196

(51) Int. Cl.
*H01R 13/115* (2006.01)
*H01R 13/629* (2006.01)
(Continued)

(52) U.S. Cl.
CPC .............. *H01R 13/629* (2013.01); *F16K 31/02* (2013.01); *F23N 5/105* (2013.01); *G01K 7/023* (2013.01);
(Continued)

(58) Field of Classification Search
CPC .. H01R 13/115; H01R 13/113; H01R 13/187; H01R 13/20
See application file for complete search history.

(56) References Cited

U.S. PATENT DOCUMENTS 2,697,820 A * 12/1954 Elliott et al. ................... 439/849
2,701,350 A * 2/1955 Soreng .......................... 439/849
(Continued)

FOREIGN PATENT DOCUMENTS

| EP | 691510 A1 | 1/1996 |
| EP | 1707879 B1 | 5/2010 |
| GB | 1075231 A | 7/1967 |

OTHER PUBLICATIONS

International Search Report and Written Opinion of the International Searching Authority Search Report Application No. PCT/EP2013/050517 issued by the European Patent Office, Rijswijk, Netherlands dated Jan. 17, 2014.

(Continued)

*Primary Examiner* — Gary Paumen
(74) *Attorney, Agent, or Firm* — Tim L. Kitchen; Peter B. Scull; Hamilton DeSanctis & Cha LLP

(57) ABSTRACT

A thermocouple connector adapted to an electromagnetic valve, the electromagnetic valve having a quick-connect terminal with a base. The connector has an inner surface that faces the base when the connector is inserted transversally to the connection terminal. The connector includes guiding means that projects out in relation to the inner surface, extending longitudinally in the direction of insertion, adapted to guide the transverse insertion of the connector. The connector is configured to come into contact with the base through the guiding means.

17 Claims, 3 Drawing Sheets

(51) Int. Cl.
 *G01K 7/02* (2006.01)
 *F23N 5/10* (2006.01)
 *F16K 31/02* (2006.01)
 *H01R 4/24* (2006.01)

(52) U.S. Cl.
 CPC .............. *H01R 4/242* (2013.01); *H01R 13/115* (2013.01); *F23N 2035/14* (2013.01); *F23N 2900/05101* (2013.01)

(56) References Cited

U.S. PATENT DOCUMENTS

| | | | | |
|---|---|---|---|---|
| 3,660,806 | A | | 5/1972 | Stephan |
| 4,632,483 | A | * | 12/1986 | Verin ............................ 439/268 |
| 4,934,966 | A | * | 6/1990 | D'Urso ......................... 439/849 |
| 5,295,874 | A | * | 3/1994 | Yoneda et al. ................ 439/850 |
| 5,525,070 | A | * | 6/1996 | Axelsson ...................... 439/268 |
| 6,293,832 | B1 | * | 9/2001 | Yamamoto .................... 439/850 |
| 7,255,614 | B1 | * | 8/2007 | Irish et al. ..................... 439/849 |
| 7,789,720 | B2 | * | 9/2010 | Zinn ............................. 439/845 |
| 2002/0022412 | A1 | * | 2/2002 | Alonson Merino et al. .. 439/849 |
| 2003/0060090 | A1 | * | 3/2003 | Allgood et al. ............... 439/845 |
| 2005/0287877 | A1 | * | 12/2005 | Fukuda et al. ................ 439/850 |
| 2009/0036004 | A1 | * | 2/2009 | Bowen et al. ................. 439/849 |

OTHER PUBLICATIONS

International Preliminary Report on Patentability International Application No. PCT/EP2013/050517 issued by the European Patent Office, Rijswijk, Netherlands dated Jun. 4, 2014.

* cited by examiner

THERMOCOUPLE CONNECTOR ADAPTED TO AN ELECTROMAGNETIC GAS VALVE, AND THERMOCOUPLE COMPRISING THE CONNECTOR

CROSS-REFERENCE TO RELATED APPLICATIONS

This application is the US national phase of International Application No. PCT/EP2013/050517, filed Jan. 11, 2013, which claims the benefit of and priority to Spanish Patent Application No. 201230196, filed Feb. 9, 2012.

TECHNICAL FIELD

This invention relates to a thermocouple connector adapted for its connection to a valve or electromagnetic unit of a gas apparatus.

BACKGROUND

There are known fusion-type, quick-connect thermocouple connectors, adapted to be connected to electromagnetic valves adapted to a gas apparatus, which also comprise quick connector terminals.

Document EP1707879B1 describes a connection of a thermocouple that has two integrated connectors, one earth connector and one phase connector, of the thermocouple in a connector body, it being adapted for the connection to a thread of the electromagnetic valve and to a quick-connect terminal of the electromagnetic valve, the connection being inserted transversally to the electromagnetic valve.

In addition, document EP691510A1 describes an adaptor for allowing the electrical connection of a thermocouple with a quick-connect connector to different types of connection terminals of the electromagnetic valves. The adaptor comprises on one end a quick-connect terminal that has a head that is retained by the connector. The connector is inserted transversally to the connection terminal. The terminal comprises a base and retainer means that extend continuously from the base to form lobes that retain the head against the base, establishing electrical contact between the thermocouple and the electromagnetic valve.

One of the drawbacks associated with this type of connector is that the operator has to exert considerable force in order to insert the connector in the quick-connect terminal of the valve, especially in view of the fact that they have to insert various connectors.

SUMMARY OF THE DISCLOSURE

The electromagnetic valve comprises a quick-connect terminal that comprises both a base and a hole through which is fixed a phase wire of the electromagnetic valve to the quick-connect terminal, defining a connection area on the contact surface.

In addition, the connector comprises an inner surface that is arranged facing the base of the quick-connect terminal, as the connector is inserted transversally to said quick-connect terminal. The connector also comprises guiding means that projects out from the inner surface and extend longitudinally in the direction of insertion. The guiding means is adapted to guide the transverse insertion of the connector in relation to the quick-connect terminal, the connector coming into contact with the base through said guiding means. As a result, a gradual insertion is obtained, thereby reducing the insertion force an operator must exert to connect a thermocouple to the corresponding electromagnetic valve.

Additionally, the guiding means comes into contact with the contact surface of the quick-connect terminal, preventing contact with the connection surface defined on the base. As the connection surface between the phase wire of the electromagnetic valve and the quick-connect terminal is avoided, the interference that may be caused when the connector passes through said connection surface is avoided, in particular on passing through the hole. Furthermore, the connection surface, as it does not come into contact with the connector, is capable of having another type of finish that is less demanding.

As a result, an optimised connector that is easier for the operator to assemble is obtained, also guaranteeing good electrical contact between said connector and the quick-connect terminal of the valve.

These and other advantages and characteristics will be made evident in the light of the drawings and the detailed description thereof.

DETAILED DESCRIPTION

Figure 1:
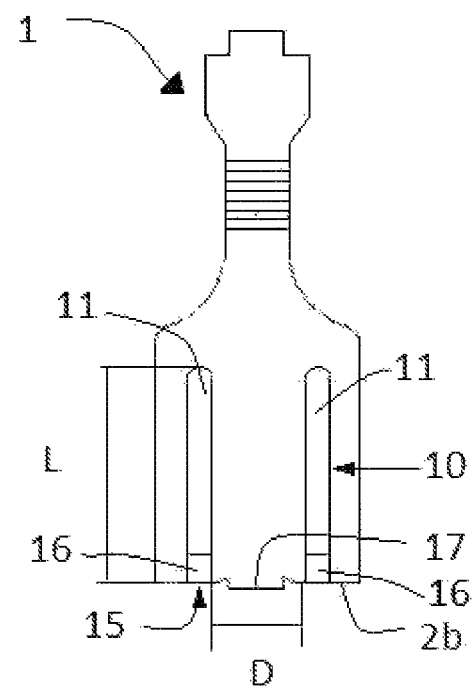
FIG. 1 shows an upper view of a thermocouple connector according to one embodiment.
Figure 2:
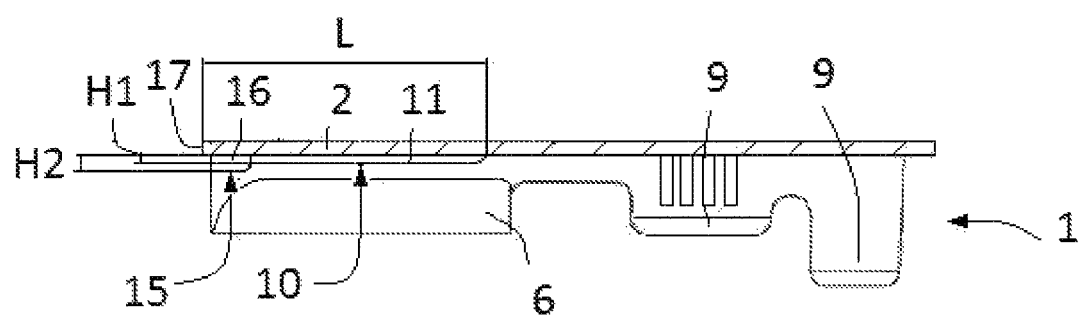
FIG. 2 shows a longitudinal section of the connector shown in FIG. 1.

FIGS. 1 to 4 and 6 show a thermocouple connector according to one embodiment. The connector 1;1' is adapted to be connected to a quick-connect terminal 3 of an electromagnetic gas valve 4 shown partially in FIGS. 3 and 4.

The electromagnetic valve 4 is known in the prior art and will not, therefore, be described in detail. The electromagnetic valve 4 comprises a phase wire 5 that passes at least partially through the quick-connect terminal 3. The quick-connect terminal 3 comprises on one end a head 3c that collaborates with retainer means 6 of the connector 1;1' of the thermocouple to fix the connector 1;1' to the quick-connect terminal 3. The head 3c comprises a base 3a adapted to come into contact electrically with the connector 1;1', the base 3a being substantially flat.

In addition, the quick-connect terminal 3 also comprises a coaxial hole 3b that passes axially through said quick-connect terminal 3, including the head 3c. The phase wire 5 is housed in said hole 3b, being fixed to the quick-connect terminal 3 by a welded seam 8. The connection of the phase wire 5 to the quick-connect terminal 3 defines an electrical connection surface A on the base 3a, shown in FIG. 5. In the embodiment shown in the figures the connection surface A is defined by the diameter of the hole 3b.

Figure 3:
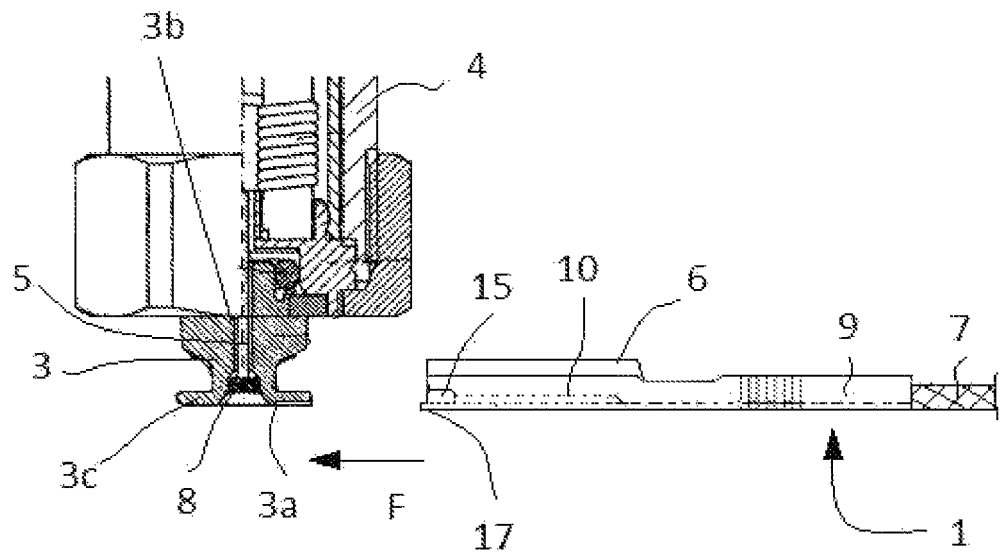
FIG. 3 shows a partial sectional view of an electromagnetic valve and the connector of the thermocouple shown in FIG. 1 prior to its insertion.
Figure 4:
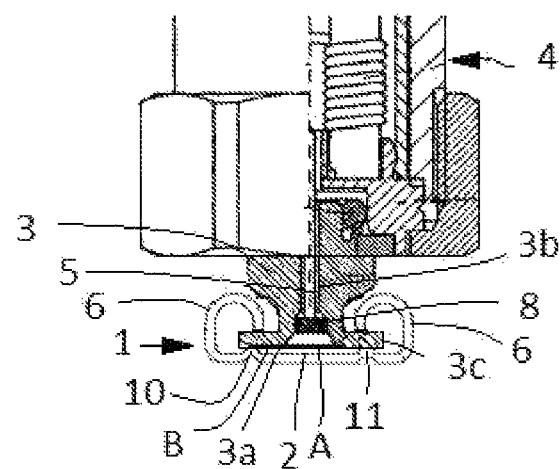
FIG. 4 shows a cross-section of the connector shown in FIG. 1 fitted to a terminal of an electromagnetic valve.

Furthermore, the connector 1;1' is a Faston-type connector, that is connected to one end of a phase cable 7, partially shown in FIG. 3, of a thermocouple not shown in the figures, the connector 1;1' comprising flaps 9 that are folded over to hold the phase cable 7 of the thermocouple to the connector 1;1'. The connector 1;1' comprises an inner surface 2 adapted to come into contact with the base 3a of the quick-connect terminal 3, the retainer means 6 extending continuously to the inner surface 2. The inner surface 2 is substantially flat and the retainer means 6 comprise lobes, each one of which extends laterally continuously to the inner surface 2, holding the head 3c of the quick-connect terminal 3 against the inner surface 2.

Additionally, the connector 1;1' is inserted transversally in relation to the quick-connect terminal 3 of the electromagnetic valve 4, according to the direction of insertion F shown in FIG. 3. To enable the insertion and reduce the insertion force that the person installing it has to exert to fix the thermocouple to the electromagnetic valve 4, the connector 1;1' comprises guiding means 10 arranged on the inner surface 2, adapted to guide the transverse insertion of the connector 1;1' in relation to the quick-connect terminal 3. The guiding means 10 project out in relation to the inner surface 2, extending longitudinally in the direction of insertion, the connector 1;1' coming into contact with the base 3a of the quick-connect terminal 3 through the guiding means 10. As a result, contact with the connection surface A defined on the base 3a is prevented.

The guiding means 10 comprises at least one guide 11 that projects out from the inner surface 2, extending from said inner surface 2, continuously and longitudinally to the inner surface 2. Each guide 11 projects out in relation to the inner surface 2 by a height H1. According to one embodiment the height H1 is approximately 0.2 mm. In other embodiments the height H1 may be different, such as, for example, approximately 0.5 mm. In addition, each guide 11 extends from a free end 2b of the inner surface 2 by a length L greater than the diameter of the base 3a.

Figure 5:
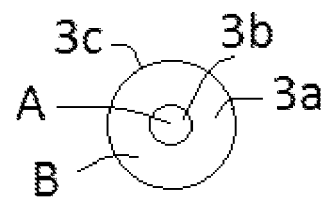
FIG. 5 shows an upper view of the terminal of the electromagnetic valve shown in FIG. 4.

Each guide 11 is adapted to come into contact with a contact surface B of the base 3a of the quick-connect terminal 3, shown in FIG. 5. The contact surface B is the area of the base 3a of the quick-connect terminal 3, it being substantially flat and free of potential unevenness on the connection surface A due to the connection between the phase wire 5 of the electromagnetic valve 4 and the quick-connect terminal 3.

In the embodiment shown in the figures, the head 3c is substantially cylindrical, the contact surface B being defined as the area delimited between the outer diameter of the head 3c and the diameter of the connection surface A.

In the embodiment shown in the figures, the guiding means 10 comprises two guides 11 arranged substantially parallel to each other, extending continuously and longitudinally to the inner surface 2 and being adapted to come into contact with the contact surface B. The guides 11 are arranged separated by a distance D, shown in FIGS. 1 and 6, greater than the diameter of the hole 3b of the quick-connect terminal 3. As a result, good electrical contact between the guides 11 and the contact surface B of the quick-connect terminal 3 is guaranteed, eliminating the interference that would be caused as it passes through the connection surface A.

In addition, in the embodiment shown, each guide 11 is obtained by pressing. Each guide 11 has a U-shaped cross-section, the cross-section being capable of being curved or straight. In other embodiments not shown in the figures, the guide 11 may have a cross-section of a different shape.

Each guide 11 has a curved cross-section. In other embodiments each guide 11 may have a U-shaped cross-section.

Furthermore, the connector 1;1' of the thermocouple comprises locking means 15 arranged on the inner surface 2, adapted to lock an axial movement of the connector 1;1' in relation to the quick-connect terminal 3 when the connector is attached to the quick-connect terminal 3. The locking means 15 is safety means as it prevents the connector 1;1' from coming away accidentally in relation to the electromagnetic gas valve 4 when said connector 1;1' is subjected to rotary forces in both directions. The rotary forces cause transverse movements of the connector 1;1' in relation to the electromagnetic valve 4, eventually causing the disconnection of the connector 1;1' thereby representing a hazard to the installation.

The locking means 15 comprises at least one stopper 16 that extends from the inner surface 2, projecting out in relation to the guiding means 10. Each stopper 16 projects out substantially orthogonally to the inner surface 2 by a height H2 with which it locks the relative movement of the connector 1;1' in relation to the quick-connect terminal 3, also minimising the angle of insertion with which the user must approach the connector 1;1' in relation to the quick-connect terminal 3 in order to connect it. According to one embodiment the height H2 is approximately 0.4 mm.

In addition, each stopper 16 is arranged aligned to the guiding means 10 in the direction of insertion F, extending longitudinally in the direction of insertion from a free end 2b of the inner surface 2. The length of the guiding means 10 should be at the very least the diameter of the contact surface B. In the embodiment shown in the figures the locking means 15 comprise two stoppers 16, each stopper 16 being arranged aligned longitudinally to the respective guide 11 and continuous to said respective guide 11.

In the embodiments shown in the figures, each stopper 16 is obtained by pressing. Each stopper 16 has a U-shaped cross-section, the cross-section being capable of being curved or straight. In other embodiments not shown in the figures the stopper 16 may have a different cross-section.

Finally, the arrangement of the guiding means 10 and the locking means 15 enables the modification of an area for cutting the base material to manufacture the connector 1;1', in relation to the cutting area of known connectors. In one embodiment, therefore, shown in FIG. 1, the connector 1 comprises a cutting burr 17 generated by the cutting area, which projects out minimally in relation to the end 2b of the inner surface 2. The cutting burr 17 defines the maximum insertion of the connector 1 in relation to the quick-connect terminal 3. Each electromagnetic valve 4 is arranged inserted into a tap body, protected by a plastic cap, not shown in the figures. The cutting burr 17, which projects out longitudinally in the direction of insertion, is minimal, being a maximum of approximately 1 mm, thereby ensuring a correct insertion of the connector 1 with the electromagnetic valve 4 inside the tap cap. This thereby prevents the cutting burr 17 from hitting the walls of the tap cap without said connector 1 having been inserted fully, until the stopper 16 of the connector 1 hits the head 3c of the quick-connect terminal 3, holding it in place.

Figure 6:
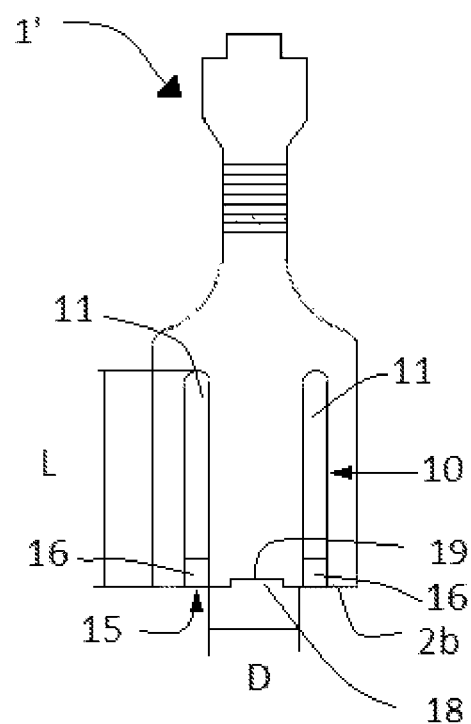
FIG. 6 shows an upper view of a connector according to a second embodiment.

In other embodiments, such as the one shown in FIG. 6, the connector 1' comprises another zone for cutting the base material, a recess 18 that extends from the end 2b of the inner surface 2. The recess 18 is arranged centrally in relation to the inner surface 2. The cutting of material in order to make the connector 1' is carried out in the recess 18, thereby preventing the cutting burr 19 generated by said cutting from projecting out longitudinally in relation to the end 2b of the surface. In this case, it is the end 2b of the inner surface 2 that defines the maximum insertion of the connector 1' in relation to the quick-connect terminal 3, given that it is said end 2b and not the cutting burr 19 that hits the walls of the tap cap when the connector 1' is fully inserted, the stopper 16 hitting the head 3c, holding it in place.

Although in the embodiments shown in the figures the connector is a phase connector, in other embodiments not shown in the figures the connector may also be used to connect the mass of the thermocouple to the mass of the electromagnetic valve.

The invention claimed is:

1. A thermocouple connector adapted to be connected to a quick-connect terminal of an electromagnetic gas valve, the quick-connect terminal having a base with a contact surface electrically coupled to the electromagnetic gas valve, the connector comprising:
   an inner surface that is arranged for facing the base of the quick-connect terminal, the inner surface having a free end,
   a first guide that projects out in relation to the inner surface, extending longitudinally in a direction of insertion and configured to make electrical contact with the base of the quick-connect terminal; and
   a first stopper arranged on the inner surface projecting out in relation to the first guide and arranged aligned to the first guide in the direction of insertion extending longitudinally in the direction of insertion from the free end of the inner surface, the first stopper adapted to lock a transverse movement of the connector in relation to the quick-connect terminal once the connector has been attached to the quick-connect terminal.

2. A thermocouple connector according to claim 1, wherein the first guide has a length greater than or equal to the diameter of the contact surface of the quick-connect terminal to which the connector is intended to be connected.

3. A thermocouple connector according to claim 1, wherein the first guide has a U-shaped cross-section.

4. A thermocouple connector according to claim 1, wherein the first guide is pressed into the inner surface.

5. A thermocouple connector according to claim 1, further comprising a second guide that projects out in relation to the inner surface, extending longitudinally in the direction of insertion and configured to make electrical contact with the base of the quick-connect terminal, the first and second guides arranged substantially parallel to each other.

6. A thermocouple connector according to claim 5, further comprising a second stopper arranged on the inner surface projecting out in relation to the second guide and arranged aligned to the second guide in the direction of insertion extending longitudinally in the direction of insertion from the free end of the inner surface, the second stopper adapted to lock a transverse movement of the connector in relation to the quick-connect terminal once the connector has been attached to the quick-connect terminal.

7. A thermocouple connector according to claim 1, further comprising a cutting burr that projects out longitudinally from the free end of the inner surface by a maximum of one millimeter.

8. A thermocouple connector according to claim 1, further comprises a cutting burr situated in a recess within the free end of the inner surface, the cutting burr not projecting outside the recess.

9. An assembly comprising:
   an electromagnetic gas valve having a quick-connect terminal that has a base and a hole through which is fixed a phase wire of the electromagnetic gas valve,
   a thermocouple comprising a connector,
   the connector comprising:
      an inner surface that is arranged for facing the base of the quick-connect terminal, the inner surface having a free end,
      a first guide that projects out in relation to the inner surface, extending longitudinally in a direction of insertion and configured to make electrical contact with the base of the quick-connect terminal; and
      a first stopper arranged on the inner surface projecting out in relation to the first guide and arranged aligned to the first guide in the direction of insertion extending longitudinally in the direction of insertion from the free end of the inner surface, the first stopper adapted to lock a transverse movement of the connector in relation to the quick-connect terminal once the connector has been attached to the quick-connect terminal.

10. An assembly according to claim 9, wherein the first guide has a length greater than or equal to the diameter of the contact surface of the quick-connect terminal to which the connector is intended to be connected.

11. An assembly according to claim 9, wherein the first guide has a U-shaped cross-section.

12. An assembly according to claim 9, wherein the first guide is pressed into the inner surface.

13. An assembly according to claim 9, further comprising a second guide that projects out in relation to the inner surface, extending longitudinally in the direction of insertion and configured to make electrical contact with the base of the quick-connect terminal, the first and second guides arranged substantially parallel to each other.

14. An assembly according to claim 13, further comprising a second stopper arranged on the inner surface projecting out in relation to the second guide and arranged aligned to the second guide in the direction of insertion extending longitudinally in the direction of insertion from the free end of the inner surface, the second stopper adapted to lock a transverse movement of the connector in relation to the quick-connect terminal once the connector has been attached to the quick-connect terminal.

15. An assembly according to claim 9, further comprising a cutting burr that projects out longitudinally from the free end of the inner surface by a maximum of one millimeter.

16. An assembly according to claim 9, further comprises a cutting burr situated in a recess within the free end of the inner surface, the cutting burr not projecting outside the recess.

17. An assembly according to claim 13, wherein the diameter of the hole in the quick-connect terminal of the electromagnetic gas valve defines a connection surface on the base, the first and second guides being arranged separated by a distance greater than the diameter of the hole of the quick-connect terminal.

* * * * *